(12) United States Patent
Fedosovsky et al.

(10) Patent No.: US 10,871,202 B2
(45) Date of Patent: Dec. 22, 2020

(54) INVERTED ROLLER SCREW REDUCTION GEAR

(71) Applicant: Joint Stock Company "Diakont", Saint Petersburg (RU)

(72) Inventors: Mikhail Evgenievich Fedosovsky, Saint Petersburg (RU); Vadim Igorevich Dunaev, Saint Petersburg (RU); Roman Vladimirovich Pustozerov, Saint Petersburg (RU)

( * ) Notice: Subject to any disclaimer, the term of this patent is extended or adjusted under 35 U.S.C. 154(b) by 0 days.

(21) Appl. No.: 16/092,157

(22) PCT Filed: Apr. 7, 2017

(86) PCT No.: PCT/RU2017/000213
§ 371 (c)(1),
(2) Date: Oct. 8, 2018

(87) PCT Pub. No.: WO2017/176169
PCT Pub. Date: Oct. 12, 2017

(65) Prior Publication Data
US 2019/0093735 A1 Mar. 28, 2019

(30) Foreign Application Priority Data
Apr. 8, 2016 (RU) ................................ 2016113536

(51) Int. Cl.
*F16H 1/28* (2006.01)
*B25J 9/10* (2006.01)
(Continued)

(52) U.S. Cl.
CPC ................ *F16H 1/28* (2013.01); *B25J 9/102* (2013.01); *F16H 25/04* (2013.01); *F16H 25/2252* (2013.01)

(58) Field of Classification Search
CPC ............................. F16H 25/04; F16H 25/2252
See application file for complete search history.

(56) References Cited

U.S. PATENT DOCUMENTS

| | | | |
|---|---|---|---|
| 3,686,968 A | 8/1972 | Ehrlenspiel et al. | |
| 4,037,893 A | * 7/1977 | Perrin | ................. F16H 25/2252 384/550 |

(Continued)

FOREIGN PATENT DOCUMENTS

| | | |
|---|---|---|
| EP | 2647877 A1 | 9/2013 |
| JP | S5415987 A | 2/1979 |

(Continued)

OTHER PUBLICATIONS

European Search Report from the corresponding European Application No. 16190445.3, dated Oct. 23, 2017.

(Continued)

*Primary Examiner* — Timothy Hannon
(74) *Attorney, Agent, or Firm* — Womble Bond Dickinson (US) LLP (57) ABSTRACT

A roller reducer comprises: an input member, a support member, an output member, and rollers, wherein the output member comprises output member nuts having a number of thread starts different from the number of thread starts on the support member nuts, wherein the rollers are arranged around the at least two support member nuts and the at least two output member nuts in such manner that each roller portion out of at least one pair of roller portions engages at least one of at least one of the support member nuts and at least one of the output member nuts.

7 Claims, 5 Drawing Sheets

(51) Int. Cl.
*F16H 25/04* (2006.01)
*F16H 25/22* (2006.01)

(56) References Cited

U.S. PATENT DOCUMENTS

| | | | | |
|---|---|---|---|---|
| 7,201,700 | B2* | 4/2007 | Buxton | B64C 3/50 |
| | | | | 475/341 |
| 7,651,436 | B2* | 1/2010 | Sugitani | F16C 19/50 |
| | | | | 475/341 |
| 9,109,667 | B2 | 8/2015 | Jeong | |
| 2015/0267776 | A1* | 9/2015 | Fedosovsky | F16H 1/2863 |
| | | | | 475/335 |

FOREIGN PATENT DOCUMENTS

| | | |
|---|---|---|
| JP | H10231903 A | 9/1998 |
| RU | 2466315 C1 | 11/2012 |
| RU | 137644 U1 | 2/2014 |
| RU | 160125 U1 | 3/2016 |
| SU | 312998 A1 | 10/1971 |
| SU | 1294606 A1 | 3/1987 |

OTHER PUBLICATIONS

Decision to Grant a Patent from the corresponding Japanese Patent Application No. 2019-503894, dated Oct. 10, 2019.

* cited by examiner

INVERTED ROLLER SCREW REDUCTION GEAR

FIELD

The invention relates to planetary mechanisms for transmitting rotational movement. Particularly, the invention relates to planetary reducers having stepped threaded rollers. More particularly, the invention relates to roller reducers.

BACKGROUND

Roller reducers are a subset of planetary reducers and can be used for adjusting torque. Roller reducers can be used in robots, manipulators and power drives requiring transmission of large torques under size restrictions. Advantageously, roller reducers have simple design and few components; provide high kinematic accuracy provided by a short kinematic chain and many contact points; provide smooth and low-noise operation; have small dimensions while providing high transmitted torque; and enable operation at high input shaft rotation velocities.

EA 201500520 discloses a roller reducer that is considered to be prior art for the present invention and comprises a screw and threaded rollers forming a planetary gear, and input member nuts and output member nuts, wherein the rollers are arranged within the input member nuts and the outer member nuts. The input member nuts are engaged with the roller input threads which are engaged with screw threads, and the output member nuts are engaged with the roller output threads.

According to EA 201500520, the input member nuts arranged on the edges are fixedly mounted or locked to refrain from rotation and displacement with respect to each other. This locking can be implemented by means of mechanical elements. As an example, the mechanical locking can be realized by the reducer body. Disadvantageously, space within the nuts is occupied by rollers received therein; therefore, the mechanical elements can only be arranged outside. However, in this case, said mechanical elements would interfere with connection between the output member nuts and the working body shaft if said connection is implemented using a coaxial coupling. Therefore, the structure of the reducer according to the known solution cannot transmit full rotation from the reducer output member to the working body without an intermediate gear. The intermediate gear can be embodied as a gearwheel arranged within the mechanical couplings. In this case, the gearwheel on one side thereof will contact the reciprocal gearwheel mounted on the working body shaft.

There is often a need for mechanisms having an output member providing coaxial coupling of the reciprocal mechanism and transmission of full rotation thereto, including by means of mounting the disclosed mechanism on the input shaft of the reciprocal mechanism. In particular, said need arises in cases when it is impossible to connect two mechanisms by means of an intermediate gear or other elements, e.g. due to a lack of space for said gears or elements. The arrangement disclosed in EA 201500520 cannot be used as a structure with an output member providing a coaxial coupling of the reciprocal mechanism due to the fact that the space within output member nuts is occupied by other reducer elements.

Thus, it is an object of the present invention to provide a roller reducer structure providing coaxial coupling of the reciprocal mechanism and transmission of full rotation thereto; said structure allows mounting of the reducer directly on the equipment required, without using any intermediate gear.

SUMMARY

In one aspect there is provided a roller reducer, comprising an input member comprising at least two input member nuts having inner multi-start threads of different directions, said nuts fixedly mounted with respect to each other, a support member comprising at least two support member nuts having multi-start threads of different directions, said nuts fixedly mounted with respect to each other, an output member comprising at least two output member nuts having multi-start threads of different directions, said nuts fixedly mounted with respect to each other, wherein the output member nuts comprise a number of thread starts different from the number of thread starts on the support member nuts;

rollers comprising at least one pair of portions having threads of different directions;

wherein the multi-start threads of the support member nuts and of the output member nuts are arranged on the outer surface thereof, the rollers are arranged around the at least two support member nuts and the at least two output member nuts in such manner that each roller portion out of the at least one pair of roller portions engages at least one of at least one of the support member nuts and at least one of the output member nuts, and the at least two input member nuts are arranged around the rollers in such matter that the at least one pair of roller portions engages the threads of the input member nuts.

Thus, the output member of the roller reducer is arranged internally with respect to the input member, and as a result, external load can be applied directly to the output member of the roller reducer without using an intermediate gear The invention enables transmitting full rotation from the reducer output member without using an intermediate gear.

In one embodiment, the at least two input member nuts are formed integrally.

In another embodiment, the at least two output member nuts are formed integrally.

In yet another embodiment, the roller reducer comprises an output shaft arranged within the output member nuts and coupled thereto.

In yet further embodiment, each roller comprises at least one support element arranged between the at least two portions of each roller, and the input member nuts and the output member nuts comprise reciprocal support elements arranged between said nuts and corresponding to the roller support elements when the input member nuts and the output member nuts engage the at least two roller portions.

Furthermore, each roller can comprise two support elements arranged on the roller ends, and the roller reducer can comprise reciprocal support elements received in the body coaxially with the input member nuts and the output member nuts, the reciprocal support elements engaging the two roller support elements. The reciprocal support elements can be formed by rings that are not connected to the body.

In one embodiment, the support elements can be formed by support bands having diameters equal to the mean thread diameter of engaged roller portions and the nuts, respectively.

In one embodiment, threads of the input member nuts, the output member nuts and the support member nuts can be pre-loaded.

In yet another embodiment, the rollers can comprise at least two pairs of portions having threads of different directions. In this case, the thread diameter of one pair of portions can differ from the thread diameter of the second pair of portions.

BRIEF DESCRIPTION OF THE DRAWINGS

Following is the detailed description of specific embodiments of the present invention with reference to accompanying drawings, wherein.

DETAILED DESCRIPTION

Figure 1:
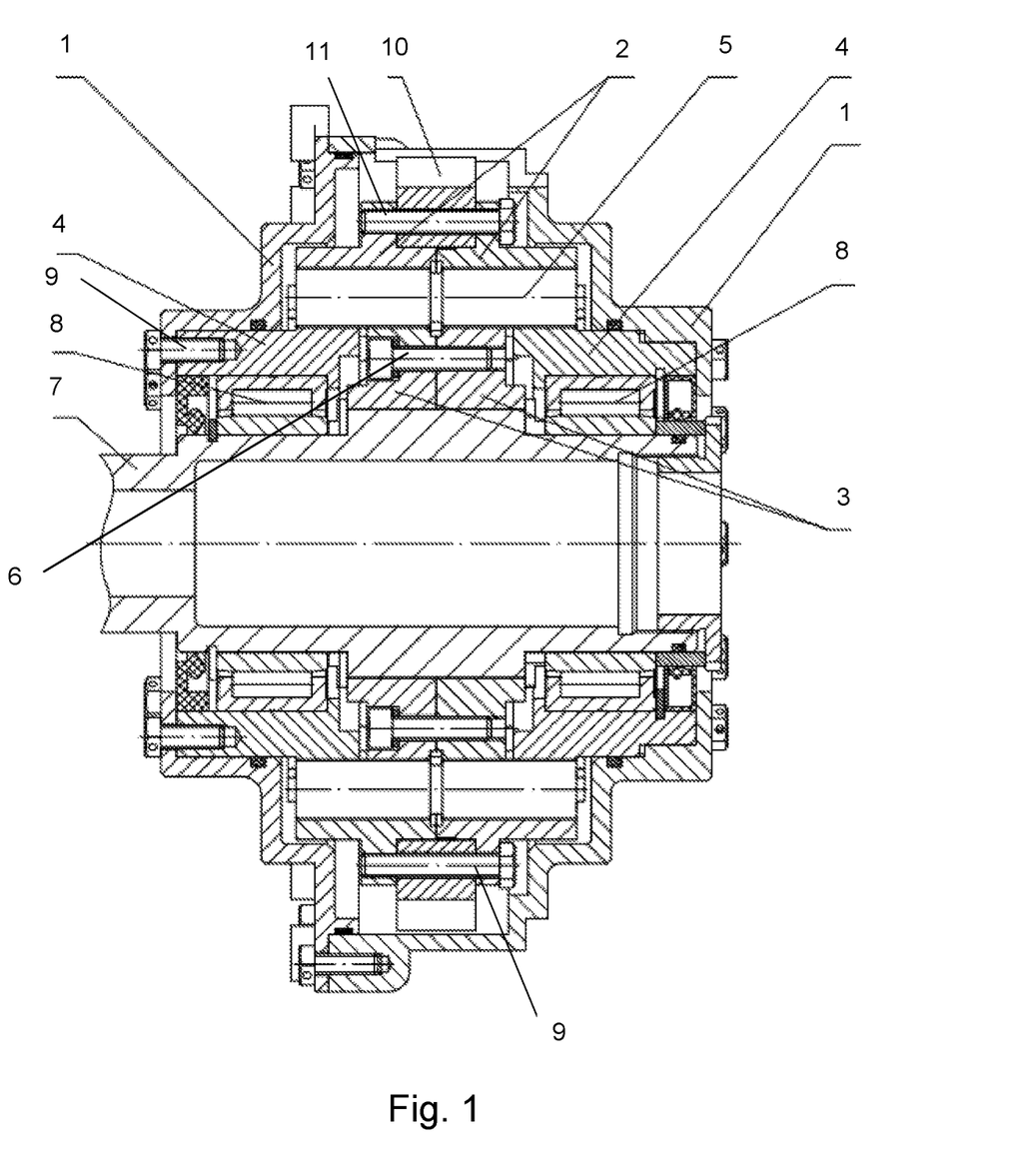
FIG. 1 is a side sectional view of the assembled roller reducer according to one embodiment of the present invention.

In one embodiment shown in FIG. 1, a roller reducer comprises a body 1 which receives a reducer input member, an output member, a support member, and rollers 5. The input member comprises two input member nuts 2. The output member comprises two output member nuts 3. The support member comprises two support member nuts 4.

While the illustrated roller reducer comprises two input member nuts 2, two output member nuts 3, and two support member nuts 4; the present invention is not limited to said embodiment, and the roller reducer can comprise more nuts of each type, as required.

Two output member nuts 3 cannot be axially displaced because they are fixedly mounted with respect to each other by fixing members, e.g. by screws 6 inserted into dedicated grooves in the nuts 3. To prevent angular displacement of the nuts 3 with respect to each other, the nuts can be coupled by spline joint (not shown).

Optionally, two output member nuts 3 can be formed integrally.

Figure 2:
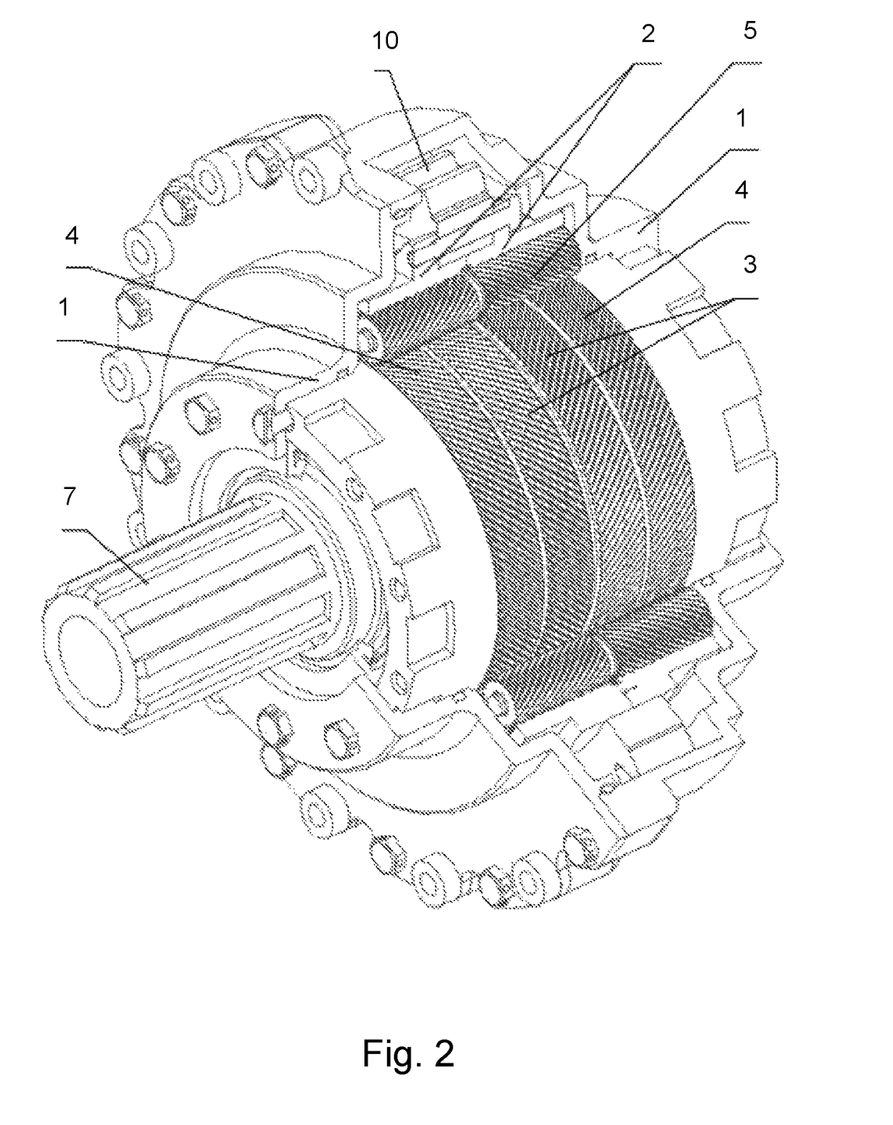
FIG. 2 is a perspective view of the roller reducer shown in FIG. 1 with the body and rollers partially removed.

As can be seen in FIGS. 1-2, the roller reducer further comprises a shaft 7 extending within the nuts 3 and attached thereto. The shaft 7 can be hollow or solid. In the latter case, intermediary members (e.g., shaft couplings) can be used for connecting a reciprocal mechanism. It is understood that other elements providing rotation transmission from the reducer output member to the reciprocal mechanism can be used instead of the shaft.

The two support member nuts 4 are also arranged around the output shaft 7 on both sides of the nuts 3. The shaft 7 is supported by the support member nuts 4 via bearings 8. The nuts 4 are fixedly mounted with respect to each other to prevent axial displacement by means of fixing members extending through the body 1, e.g. by means of screws 9 arranged in dedicated grooves in the body 1 and in the support nuts 5. In order to prevent angular displacement of the nuts 4 with respect to each other, a spline joint coupling with the body 1 is used (not shown).

The rollers 5 are arranged around the nuts 3 and 4 and evenly spaced around periphery of said nuts. In the present embodiment, each roller 5 comprises two portions having threads of different directions and equal diameter. The thread of said two roller 5 portions is symmetrical with respect to the plane perpendicular to the roller axis and passing through the center of the roller. Each of the two roller 5 portions is engaged with the nut 2, 3 and 4 threads for transmission of input torque from the nuts 2 to the rollers 5 and further to the nuts 4.

To provide reduction, in the present embodiment of the roller reducer, the support member nuts 4 comprise a number of thread starts different from the number of thread starts of the output member nuts 3.

In the present embodiment, the roller reducer comprises twenty four rollers 5. However, the present invention is not limited to the present embodiment, and a greater or smaller number of the rollers 5 can be used; the number of rollers is selected based on kinematic and strength calculations for the reducer. Due to the fact that the rollers 5 rotate around the support member nuts 4 and the output member nuts 3 and not within said nuts, the maximum number of the rollers 5 would be greater than the maximum number of rollers in configurations with rollers placed within said nuts, such as the configuration disclosed in EA 201500520. It is to be understood that the more rollers are used, the more contact points are between the rollers 5 and the nuts, and therefore, the load is distributed more evenly across reducer elements. Thus, an increase in number of the rollers 5 allows to increase load-bearing capacity and endurance of a the roller reducer.

The input member nuts 2 are arranged around the rollers 5 and fixedly mounted to prevent axial displacement with respect to each other and to an input gearwheel 10 used in the present embodiment for transmitting rotation to the input member by means of fixing members, e.g. screws 11. In order to prevent angular displacement of the nuts 2 with respect to each other, the nuts can be coupled by spline joint (not shown).

Each of the two nuts 2 comprises an internal thread of different directions. Alternatively, the nuts 2 are formed integrally and comprise two portions having threads of different directions. Furthermore, the integrally formed nuts 2 can share a common thread. In this case, reducer elements are additionally fixed to prevent axial displacement that would occur under the effect of axial force compensated for by two threads of different directions in the first example.

Other embodiments of fixation of nuts 2, 3 and 4 will be apparent to those skilled in the art, e.g. fixation by means of pins, a spline joint, etc., to prevent rotation, and by means of a keyed joint, pins, etc., to prevent axial displacement.

To prevent the rollers 5 from rolling out of the nuts 2, 3 and 4, the elevation angles of the roller 5 portion threads are equal to elevation angles of the nut 2 and 4 threads. The thread direction of the rollers 5 is similar to the thread direction of the nuts 2 and is opposite to the thread direction of the nuts 3 and 4. Two roller 5 portions with threads of different directions prevent the rollers 5 from slipping along thread turns of the nuts 2, 3 and 4.

It should be noted that thread orientation in each input member nut pair, each support member nut pair, and each output member nut pair should mirror the vertical plane of symmetry of the reducer exactly.

Figure 3:
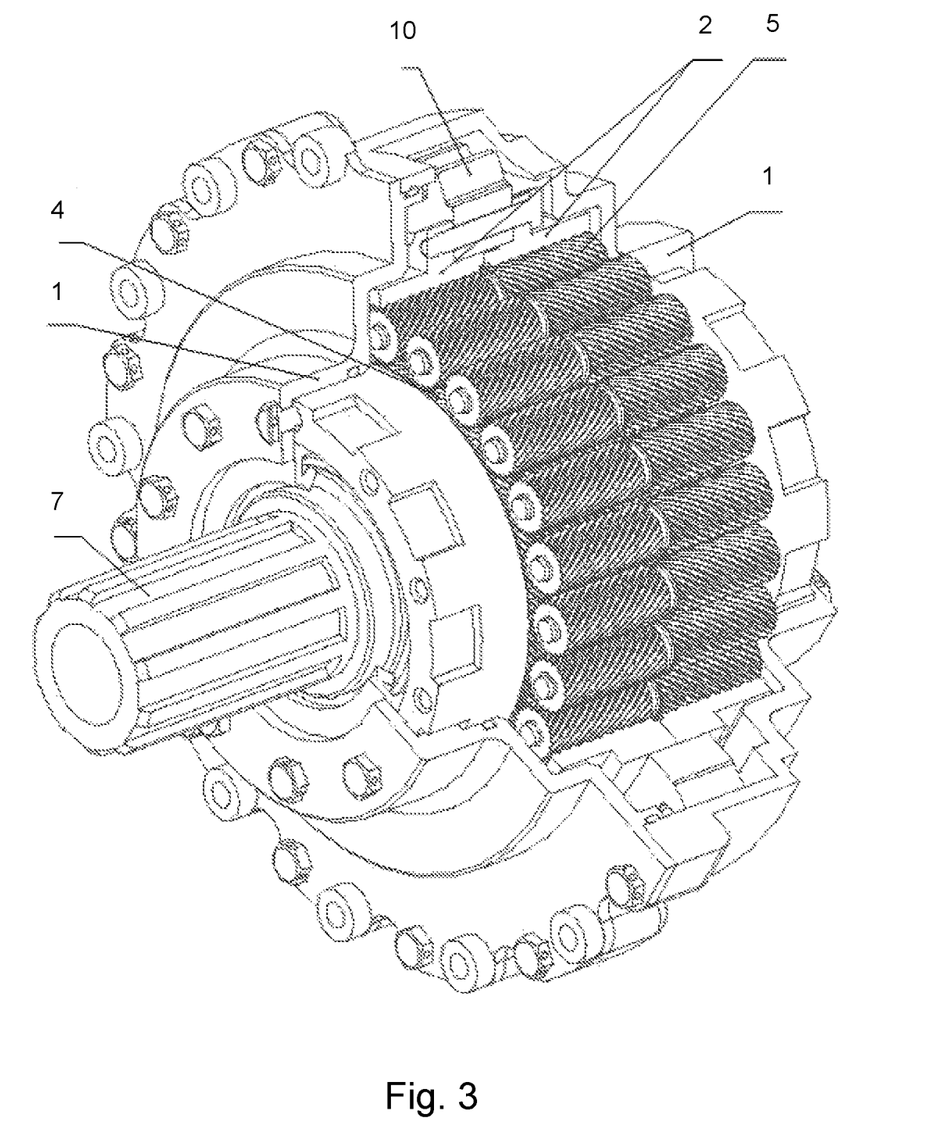
FIG. 3 is a perspective view of the roller reducer shown in FIG. 1 with the body partially removed.
Figure 4:
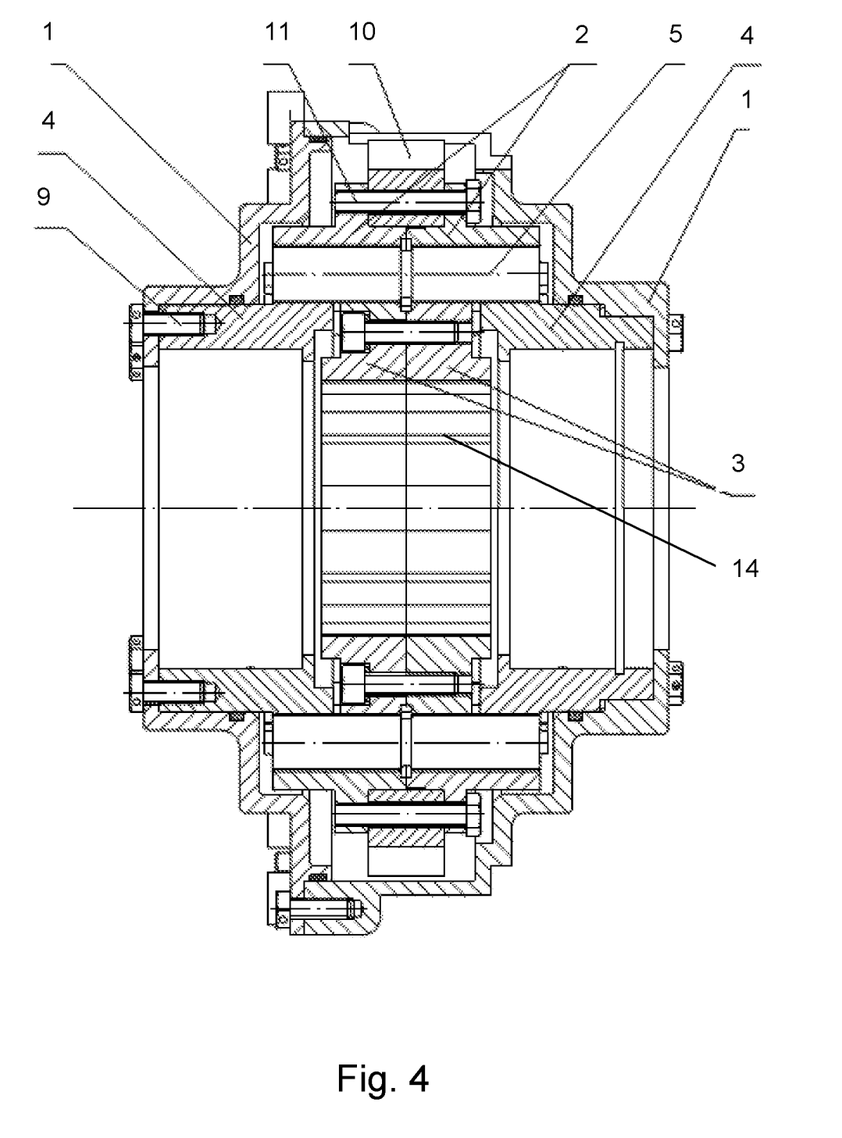
FIG. 4 is a side sectional view of the assembled roller reducer according to another embodiment of the present invention.

FIG. 4 shows an embodiment of the roller reducer according to the present invention similar to the embodiment described with reference to FIGS. 1-3. The roller reducer of the present embodiment differs from the previous embodiment in that the output shaft received within the output member nuts 2 is omitted. In this case, the coupled equipment is fixed directly within the output nuts 2, wherein the inner surface thereof can be provided with corresponding fixing members, e.g. splints 14.

Figure 5:
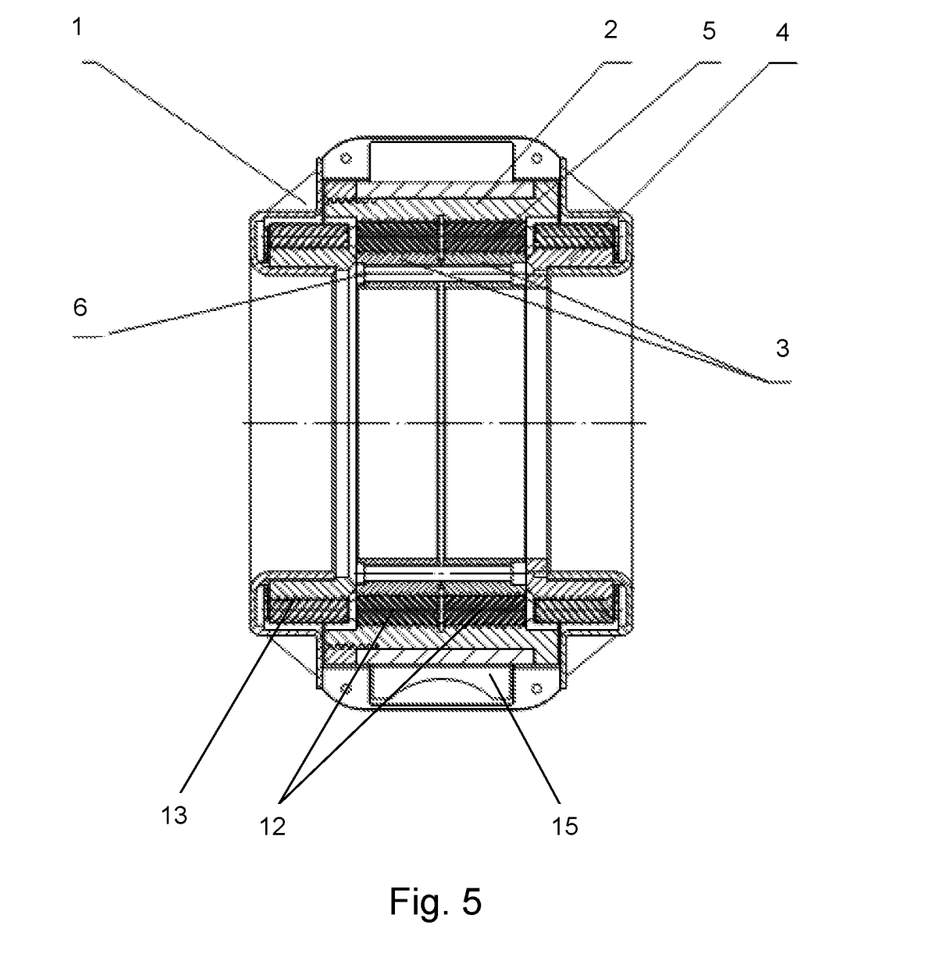
FIG. 5 is a side sectional view of the assembled roller reducer according to yet another embodiment of the present invention.

FIG. 5 shows yet another embodiment of the roller reducer similar to the embodiments described with reference to FIGS. 1-4. The present embodiment differs from the previously disclosed embodiments in that each roller 5 comprises two pairs of portions 12 and 13 having multi-start threads of different diameter. In each pair, the portions are formed with threads of different directions. In the present embodiment, the portions 12 arranged in the central part of the rollers 5 engage with threads of the output member nuts 3 and with threads of the input member nuts 2, while the portions 13 arranged on the edges of the rollers 5 engage with threads of the support member nuts 4. A worm wheel 15 is used for transmitting rotation to the input member of the reducer.

In each of the above embodiments, the nuts 2, 3 and 4 and the rollers 5 can further comprise support elements (not shown) arranged in such manner that the support elements of the rollers are supported by the support elements of the nuts 2, 3 and 4.

For example, in the embodiment described with reference to FIGS. 1-4, each roller 5 comprises two threaded portions and one support element can be arranged between said roller 5 portions. In this case, the support elements can be formed by support bands. Two nuts 2 and two nuts 3 in this case comprise reciprocal support bands engaging with roller support bands.

In other embodiments, the support bands can be arranged on the rollers 5 in all gaps between thread portions and externally with respect to outermost roller threaded portions 5. In the case where the support elements are arranged on the roller ends, said support elements can be formed by support rollers.

Diameter of the support elements is selected to be equal to the mean diameter of the nut threads or roller threads, respectively. The support bands serve to prevent radial load from affecting thread surface when the roller reducer transmits heavy load. In this case, the radial load would be borne either by the threaded element body or by individual elements purposefully added to the structure. Furthermore, due to the diameters of the roller support elements and the nuts being equal to thread diameters of corresponding nut and roller portions, the roller support elements roll over the nut support elements without slippage, thus eliminating friction loss.

For example, in the embodiment wherein the support elements formed by the support rollers are arranged on the edges of the rollers 5, the radial load from the output shaft 7 is transmitted to the nuts 3 and further to the rollers 5, and then part of the load is transmitted from the rollers 5 not to the nuts 2, but through support elements and to the roller reducer body 1 with said support elements rolling over said body.

In the case wherein each roller 5 comprises two support elements arranged on the ends of the roller, reciprocal support elements formed by, e.g., rings (not shown) can be introduced into the roller reducer structure. Said rings are arranged coaxially with output member nuts and support member nuts of the reducer in such manner that the roller support elements are received within said rings. Said rings are coupled only with the rollers 5 and are not coupled with the body 1 or other elements of the reducer. In this embodiment, diameter of the roller support elements can differ from the mean diameter of the roller 5 threads.

In order to provide backlash-free transmission between the rollers 5 and the nuts 2, 3 and 4, threads of said elements can be pre-loaded. Pre-loading is carried out by selecting mean diameter of the rollers and the nuts in such manner that the sum of the mean diameter of output member nuts and the mean diameter of two rollers is greater than the mean diameter of the corresponding input member nut by a value corresponding to the required pre-load. In the present invention, pre-loading can be implemented using any suitable method known in the art.

In one embodiment of the present invention, The roller reducer operates as follows.

Rotation is transmitted to the reducer via the input gearwheel 10 to the input member nuts 2 shown in FIG. 1. Upon rotation of the nut 2, rotational torque is transmitted to rollers 5 by means of a threaded engagement. Rollers 5 roll over support member nuts 4 and attain a particular velocity of rotation around the axis of nuts 3 and 4 and around their own axes (similar to a planetary mechanism wherein the outer gearwheel is stationary, and the inner gearwheel rotates).

Due to the fact that threads on support member nuts 4 and output member nuts 4 differ in the number of starts, and two roller 5 portions have identical parameters, upon rotation of rollers 5 at a certain angular velocity, support nuts 4 and outer member nuts 3 rotate at different angular velocities.

Therefore, in the disclosed embodiments of a roller reducer according to the present invention the input member and rollers are arranged externally with respect to the output member and the support member, said technical solution thus differing from the prior art technical solution disclosed in EA 201500520. Such inverted (compared to the prior art technical solution) arrangement of reducer elements provides the possibility of direct coupling of an external mechanism to the reducer output member and the possibility of full rotation transmission without using an intermediate gear.

The present invention has been described with reference to specific embodiments; however, various changes and modifications can be readily made without departing from the spirit and scope of the present invention defined in the accompanying claims.

The invention claimed is:

1. A roller reducer comprising:
   an input member comprising at least two input member nuts having inner multi-start threads of different directions, said nuts fixedly mounted with respect to each other,
   a support member comprising at least two support member nuts having multi-start threads of different directions, said nuts fixedly mounted with respect to each other,
   an output member comprising at least two output member nuts having multi-start threads of different directions, said nuts fixedly mounted with respect to each other,
   wherein the output member nuts comprise a number of thread starts different from the number of thread starts on the support member nuts;
   rollers comprising at least one pair of portions having threads of different directions;
   wherein the multi-start threads of the support member nuts and of the output member nuts are arranged on the outer surface thereof,
   the rollers are arranged around the at least two support member nuts and the at least two output member nuts in such manner that each roller portion out of the at least one pair of roller portions engages at least one of at least one of the support member nuts and at least one of the output member nuts, and the at least two input member nuts are arranged around the rollers in such matter that the at least one pair of roller portions engages the threads of the input member nuts.

2. The roller reducer according to claim 1, wherein the at least two input member nuts are formed integrally.

3. The roller reducer according to claim 1, wherein the at least two output member nuts are formed integrally.

4. The roller reducer according to claim 1, further comprising an output shaft arranged within the output member nuts and coupled thereto.

5. The roller reducer according to claim 1, wherein the nut threads and the roller threads are pre-loaded.

6. The roller reducer according to claim 1, wherein the rollers comprise at least two pairs of portions having threads of different directions.

7. The roller reducer according to claim 6, wherein the thread diameter of one pair of portions differs from the thread diameter of the second pair of portions.

* * * * *